United States Patent
Kamada

(10) Patent No.: US 7,894,803 B2
(45) Date of Patent: Feb. 22, 2011

(54) MOBILE INFORMATION TERMINAL DEVICE, STORAGE, SERVER, AND METHOD FOR PROVIDING STORAGE REGION

(75) Inventor: Tomihisa Kamada, Tokyo (JP)

(73) Assignee: Access Co., Ltd., Tokyo (JP)

( * ) Notice: Subject to any disclaimer, the term of this patent is extended or adjusted under 35 U.S.C. 154(b) by 824 days.

(21) Appl. No.: 10/070,106

(22) PCT Filed: Jun. 28, 2001

(86) PCT No.: PCT/JP01/05539

§ 371 (c)(1),
(2), (4) Date: Feb. 27, 2002

(87) PCT Pub. No.: WO02/03199

PCT Pub. Date: Jan. 10, 2002

(65) Prior Publication Data

US 2002/0123336 A1    Sep. 5, 2002

(30) Foreign Application Priority Data

Jul. 3, 2000   (JP) .............................. 2000-201169

(51) Int. Cl.
*H04L 29/06*   (2006.01)

(52) U.S. Cl. ............... 455/414.3; 709/203; 709/216; 709/219; 709/226; 709/232; 379/88.17; 379/93.01; 379/93.12; 379/201.05; 455/420; 705/26; 707/607; 707/608; 717/172; 717/178

(58) Field of Classification Search .............. 709/203, 709/220, 229, 225, 216–219, 226, 232, 239; 455/412.1, 418–420, 414.1–414.4; 379/88.17, 379/91.02, 93.01, 93.12, 201.01, 201.05; 705/4, 21, 26; 717/168–173, 176–178; 370/351–356; 707/607, 608; *G06F 17/60, 17/30; G07F 17/16, G07F 19/00*
See application file for complete search history.

(56) References Cited

U.S. PATENT DOCUMENTS

| 5,418,837 | A  |   | 5/1995  | Johansson et al. |
|-----------|----|---|---------|------------------|
| 5,629,980 | A  | * | 5/1997  | Stefik et al. ............... 705/54 |
| 6,009,401 | A  | * | 12/1999 | Horstmann .................. 705/1 |
| 6,128,661 | A  | * | 10/2000 | Flanagin et al. ............ 709/227 |
| 6,134,593 | A  | * | 10/2000 | Alexander et al. ......... 709/229 |
| 6,275,575 | B1 | * | 8/2001  | Wu ...................... 379/202.01 |
| 6,292,473 | B1 | * | 9/2001  | Duske et al. ............... 370/316 |
| 6,308,061 | B1 | * | 10/2001 | Criss et al. ................ 455/418 |
| 6,353,792 | B1 | * | 3/2002  | Murthy ...................... 701/117 |
| 6,366,791 | B1 | * | 4/2002  | Lin et al. .................... 455/567 |
| 6,496,692 | B1 | * | 12/2002 | Shanahan ................... 455/418 |
| 6,512,919 | B2 | * | 1/2003  | Ogasawara .............. 455/422.1 |
| 6,516,318 | B2 | * | 2/2003  | Nakamura et al. ........... 707/10 |

(Continued)

FOREIGN PATENT DOCUMENTS

CA    2242404 A1    1/2000

(Continued)

*Primary Examiner*—Hemant Patel
(74) *Attorney, Agent, or Firm*—patenttm.us

(57) ABSTRACT

A user-dedicated storage area (97) of a cellular phone (10) is retained in a storage server (9) on a network (6). Software purchased by a user via a sales server (12) is not transferred directly to the user's cellular phone (10) but is stored in the user-dedicated storage area (97) of the user. The user downloads the software from his or her own dedicated storage area (97) to his or her own cellular phone (10) before using the software.

8 Claims, 16 Drawing Sheets

U.S. PATENT DOCUMENTS

| | | | |
|---|---|---|---|
| 6,629,130 B2 * | 9/2003 | Mertama et al. | 709/206 |
| 6,701,378 B1 * | 3/2004 | Gilhuly et al. | 709/249 |
| 6,799,165 B1 * | 9/2004 | Boesjes | 705/1 |
| 6,799,277 B2 * | 9/2004 | Colvin | 726/22 |
| 6,832,230 B1 * | 12/2004 | Zilliacus et al. | 707/203 |
| 6,941,270 B1 * | 9/2005 | Hannula | 705/1 |
| 6,959,325 B2 * | 10/2005 | Gardner et al. | 709/206 |
| 6,985,927 B2 * | 1/2006 | O'Brien et al. | 709/213 |
| 7,035,918 B1 * | 4/2006 | Redding et al. | 709/223 |
| 7,080,051 B1 * | 7/2006 | Crawford | 705/400 |
| 7,113,765 B2 * | 9/2006 | Minear et al. | 455/405 |
| 7,113,981 B2 * | 9/2006 | Slate | 709/217 |
| 7,266,365 B2 * | 9/2007 | Ferguson et al. | 455/412.1 |
| 7,294,776 B2 * | 11/2007 | Tohgi et al. | 84/600 |
| 7,363,026 B2 * | 4/2008 | Clarke et al. | 455/412.2 |
| 2001/0054081 A1 * | 12/2001 | Fujiwara | 709/217 |
| 2002/0059402 A1 * | 5/2002 | Belanger | 709/220 |
| 2002/0107806 A1 * | 8/2002 | Higashi et al. | 705/51 |
| 2003/0050046 A1 * | 3/2003 | Conneely et al. | 455/412 |
| 2003/0055870 A1 * | 3/2003 | Smethers | 709/203 |
| 2003/0220983 A1 * | 11/2003 | Hui | 709/219 |
| 2004/0038675 A1 * | 2/2004 | Criss et al. | 455/419 |
| 2004/0128365 A1 * | 7/2004 | Motoyama et al. | 709/219 |
| 2005/0044191 A1 * | 2/2005 | Kamada et al. | 709/223 |
| 2005/0210120 A1 * | 9/2005 | Yukie et al. | 709/217 |

FOREIGN PATENT DOCUMENTS

| | | |
|---|---|---|
| EP | 0809221 A2 * | 11/1997 |
| EP | 809221 A2 * | 11/1997 |
| EP | 0942568 A | 9/1999 |
| JP | 6-230847 | 8/1994 |
| JP | 10-124586 | 5/1998 |
| JP | 10-222579 | 8/1998 |
| WO | 98/58510 A | 12/1998 |

* cited by examiner

FIG. 6

APPLICATION MANAGEMENT TABLE 107a

| APPLICATION NAME | SALES SITE URL | FILE NAME | APPLICATION FILE SIZE | ASSOCIATED DATA FILE NAME | DATA FILE SIZE | EXPIRATION DATE | SAVE FLAG | DATA-UPDATE FLAG |
|---|---|---|---|---|---|---|---|---|
| APPLICATION 1 | http://www.···· | game1 | ○○○○B | gdata1 | ○○○B | 2000.08.31 | 1 | 0 |
| APPLICATION 2 | http://www.···· | game2 | ○○○○B | gdata2 | ○○○B | 2000.09.30 | 1 | 1 |
| APPLICATION 3 | http://www.···· | kakeibo | ○○○○B | kdata | ○○○B | 2000.06.03 | 0 | 0 |
| | | | | | | | | |

F I G. 7

USER-A-DEDICATED STORAGE AREA MANAGEMENT TABLE 92

| APPLICATION NAME | SALES SITE URL | FILE NAME | APPLICATION FILE SIZE | ASSOCIATED DATA FILE NAME | DATA FILE SIZE | EXPIRATION DATE | EFFECTIVE-NESS FLAG | NUMBER OF MONTHS | AUTOMATIC-UPDATE FLAG |
|---|---|---|---|---|---|---|---|---|---|
| APPLICATION 1 | http://www.··· | game1 | ○○○○B | gdata1 | ○○○B | 2000.08.31 | 1 | 1 | 1 |
| APPLICATION 2 | http://www.··· | game2 | ○○○○B | gdata2 | ○○○B | 2000.09.30 | 1 | 2 | 0 |
| APPLICATION 3 | http://www.··· | kakeibo | ○○○○B | kdata | ○○○B | 2000.06.03 | 0 | 1 | 1 |
| | | | | | | | | | |

FIG. 20
SELECT APPLICATION YOU WANT TO TRY.
(TRIAL PERIOD: ONE MONTH)
1. APPLICATION 1
2. APPLICATION 2
3. APPLICATION 3
4. APPLICATION 4

MOBILE INFORMATION TERMINAL DEVICE, STORAGE, SERVER, AND METHOD FOR PROVIDING STORAGE REGION

TECHNICAL FIELD

The present invention relates to a portable data terminal with the data communication capability, and more particularly to a portable data terminal whose storage capacity of the internal storage device is relatively limited.

BACKGROUND ART

Recently, portable data terminals, such as cellular phones (including a personal handy-phone system called PHS) with the Internet access capability have been widely used. Those terminals make it possible not only to make voice communications but also to provide electronic mail transmission/reception services and various services via web site access. Considering the limitation on the display screen size of a cellular phone, more and more web sites have been prepared for cellular phones.

Today, various services provided by web sites are carried out through online data transfer to and from web servers. However, because a cellular phone does not support the software capture capability that reads software from an external medium such as a CD-ROM, it is desired in the future that additional processing application programs be downloaded over the network for offline, local execution on a cellular phone.

However, as compared with non-portable data processing units such as a personal computer, the capacity of internal non-volatile storage of a cellular phone is substantially limited. In addition, at present, a cellular phone does not have a function to connect to a large-capacity external storage unit such as a hard disk drive and, even if it has such a function, the problem is that frequent connection to an external storage unit would lose the advantage of the portability of a cellular phone.

Therefore, the local execution of an additional application program (simply called an application in the specification and the drawings of the present invention) on a cellular phone has the following problems:

(1) A decrease in the free space of the internal storage unit (also called local storage) prevents new additional programs from being stored.

(2) This requires an application in the local storage to be replaced when the storage capacity becomes insufficient. However, if an application stored in the local storage is erased during application replacement and if the user paid for the application, the user must purchase the same application again the next time he or she wants to use the application. This is uneconomical for the user. If those conditions keep the user from purchasing applications, application vendors will lose the chance of sales.

(3) Such conditions as described above have prevented applications, which work on cellular phones and so on, from being sold on a network.

In view of the foregoing, it is an object of the present invention to provide a storage area providing method and a storage server capable of storing and managing software for use on portable data terminals.

It is another object of the present invention to provide a new method for selling software for use on those portable data terminals.

It is still another object of the present invention to provide a new portable data terminal and a computer program.

DISCLOSURE OF THE INVENTION

According to the present invention, there is provided a method for providing a storage area in a storage server for a portable data terminal connected over a network. The method comprises the steps of allocating a dedicated storage area for each user; storing software, which is purchase-requested at a software sales site on the network by a user, into a dedicated storage area allocated to the user of the storage server without sending the software from the sales site directly to a portable data terminal of the user; and making available the software, stored in the dedicated storage area in the storage server, to the user in response to a request from the user.

A software sales method according to the present invention comprises the steps of providing purchasable software in a home page of a sales site; receiving a purchase-request from a user via the home page; and sending the purchase-requested software or identification information associated therewith to a site of a storage server that has a dedicated storage area allocated to the user without sending the purchase-requested software directly to the user, wherein the software is stored into the dedicated storage area of the user of the storage server.

According to the method of the present invention described above, new software may be added to the dedicated storage area and required software may be downloaded, as required, into the user's portable data terminal. In particular, because purchased software is stored, not directly in the portable data terminal, but first in the dedicated storage area, the user may purchase new software without concerning about the constraints of the internal storage capacity of the user's portable data terminal. In addition, even if already stored software is erased when the internal storage capacity becomes insufficient, the same software may be downloaded again from the dedicated storage area and, therefore, the user may erase software without hesitation. As a result, the user does not hesitate to purchase new software any more just because storage capacity is limited.

User's full-set software is stored in the dedicated area of the user. Therefore, even if the user's portable data terminal is changed to a new or another portable data terminal, the user may continue to use the same dedicated storage area.

The method, wherein an expiration date until which the user may use the software stored in the storage server may be set, may further comprise the step of making the software, which is in the dedicated storage area, unavailable to the user after the expiration date.

The method may further comprise the step of charging the user for the purchase-requested software when the purchase-request is made, when the user downloads the software from the dedicated storage area, or when the user indicates an intention to continue to use after a trial period passes after the downloading.

In addition, the method may further comprise the steps of storing software, which is not purchase-requested by the user, into the dedicated storage area; allowing the user to select the software not purchase-requested; and charging the user for the software when the user downloads the selected software or when the user indicates an intention to continue to use after a trial period.

An expiration date until which the user may use the software stored in the storage server may be set, and the method may further comprise the step of making the software, which is in the dedicated storage area, unavailable to the user after the expiration date. By setting such a time limit (expiration date), it is possible to charge the user for each update. This allows the software vendor to lower the sales price for each effective period. At the same time, the user need to pay only for renewed subscription for software that is useful to him or her and may reduce wasteful costs by refusing the renewal of unnecessary software.

The above method may further comprise the steps of storing software, which is not purchase-requested by the user, into the dedicated storage area; allowing the user to select the software not purchase-requested; and charging the user for the software when the user downloads the selected software or when the user indicates an intention to continue to use after a trial period. This enables the user to select necessary software from his or her dedicated storage area and download it without having to access a sales site. Also, the vendor not only effectively informs the user of available software but also provides the user with software in the downloadable format, significantly increasing the sales chance.

A storage server according to the present invention for implementing the method described above is connected to portable data terminals over a network and comprises a storage unit having dedicated storage areas, each allocated to a user of a portable data terminal; means for receiving software, which is purchase-requested by the user of the portable data terminal, from a software sales site on the network for storing the software into the dedicated storage area of the user; a management table storing therein management information about the software stored in the dedicated storage area of the user; and means for referencing the management table in response to access from the user and for sending the software, which is stored in the dedicated storage areas of the user, to the portable data terminal of the user.

In the storage unit, the application program body of the software may be stored multiply in each of the dedicated storage areas of the users who purchased it or, alternatively, may be stored in a shared storage area common to a plurality of users while data, which is associated with the application program and corresponding to each user, being stored in separate dedicated storage areas of the users. This method saves the storage capacity necessary for the storage server. In addition, when the application program is upgraded, only one application program in the shared storage area need be updated.

A portable data terminal according to present invention used in the method described above is a portable data terminal with a network connection capability, comprising local storage into which required software is downloaded from full-set software as required, the full-set software being stored in a dedicated storage area allocated on a storage unit on a network; and a management table in which management information associated with the software stored in the local storage is stored, wherein the management information includes at least expiration date information on the software. The portable data terminal further comprises means for automatically erasing the software from the local storage when an expiration date defined by the expiration date information has passed. Because the software is automatically erased when the expiration date has arrived, the user who wants to use the same software again must purchase the software again. This allows the software vendor to virtually manage the software after the sale. In addition, setting an expiration date makes it possible to provide software at lower costs.

BRIEF DESCRIPTION OF THE DRAWINGS

FIG. 6 is a diagram showing an example of the configuration of the application management table 107a stored in the cellular phone 10 shown in FIG. 2;

FIG. 7 is a diagram showing an example of the configuration of a user-dedicated storage area management table 92 stored in the storage server 9 shown in FIG. 5;

FIG. 20 is a diagram showing an example of a trial application selection screen in the embodiment of the present invention.

BEST MODE FOR CARRYING OUT THE INVENTION

A preferred embodiment according to the present invention will be described in detail below with reference to the drawings. In the description below, a cellular phone (including a PHS) with the data communication capability (Internet access capability) will be described as an example of a portable data terminal (hereinafter simply called a terminal). Basically, the characteristics of a portable data terminal to which the present invention is applied require that a part of internally stored applications cannot be rewritten by the user and that the contents of an application or data (including the tables that will be described later) to be operated upon only by the system cannot be illegally rewritten by the user. As long as the user cannot perform such an illegal operation, any unit other than a cellular phone such as a PDA (Personal Digital Assistant), a car navigation system, or a video game unit may be used. Alternatively, if the protection function against such an alteration operation is provided, the present invention may be applied also to other units such as a personal computer (especially, a portable personal computer).

The term "software" in this specification refers generally to application programs and data. The term "data" refers narrowly to data in contrast to programs and, in the broader sense, sometimes includes application programs. The term "storage server" refers to a server that provides the user with a special storage area that may basically be used by the user freely over a network (an area to or from which software may be written or read). In addition, the "sales" of software with an expiration date according to the present invention is thought of as the "lending" of software. From a user's point of view, the "purchase" of such software may also be thought of as the "lease" of software.

Figure 1:
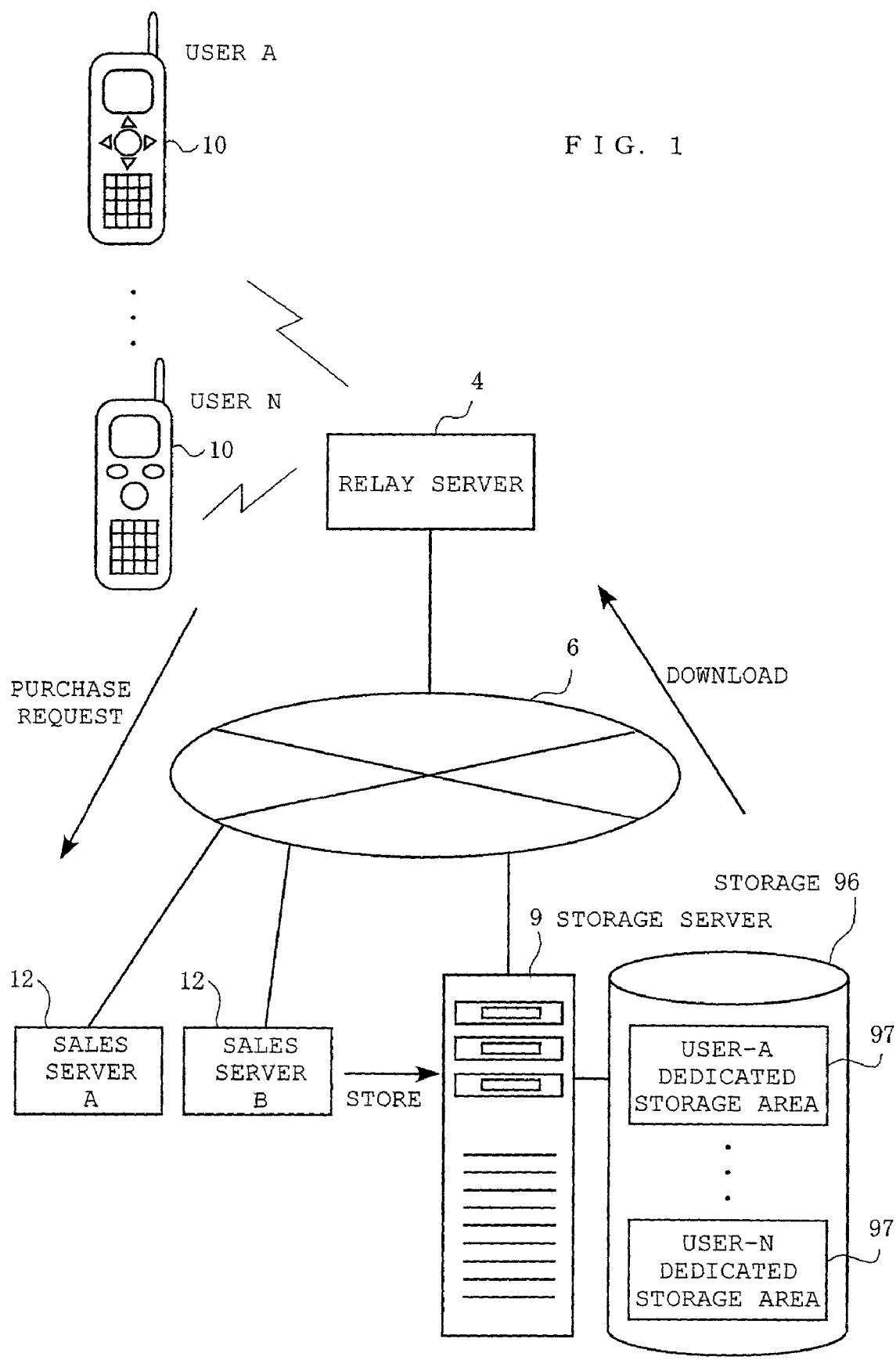
FIG. 1 is a diagram showing the outline mechanism of an entire system to which the present invention is applied.

FIG. 1 is a diagram showing the outline mechanism of an entire system to which the present invention is applied. This system comprises cellular phones 10, a relay server (gateway server) 4 that connects the cellular phones 10 to a public network 6 such as the Internet, sales servers 12 on the network 6 that sell software that will operate on the cellular phones 10, and a storage server 9 that provides dedicated storage areas 97, one for each cellular phone 10. The storage server 9 may be located anywhere, for example, in the relay server 4. In this embodiment, it is assumed that a cellular phone carrier manages the relay server 4. On the other hand, although the storage server 9 is managed primarily by the provider of the service according to the present invention, it may also be managed by the carrier that manages the relay server 4.

When the network 6 is the Internet, it is desirable that a mechanism be provided that allows only special-type portable data terminals (that do not allow users to freely operate files) such as cellular phones to access the storage server 9. This mechanism is necessary to ensure that data, such as the management tables in the terminal that will be described later, cannot be written easily. An example of this mechanism is that the server uses the "UserAgent:xxx" (this usually indicates the type of the browser that has issued the request) included in the header information of an HTTP request to determine the machine type of the terminal and then decides whether or not the terminal is allowed to access. Another mechanism is that the network 6 is built as a closed (closed) network separate from the Internet. That is, a special network may be built to allow access only through access points that may be accessed by special cellular phones.

The user can operate the cellular phone 10 anywhere in a so-called coverage zone to connect to the network 6 and access a desired sales server 12 and, from that server, select and purchase a desired application. The purchased application is once transferred to the storage server 9 and then stored in the user-dedicated storage area 97 within storage 96. At this time, information to be stored in the dedicated storage area management table (that will be described later in detail) in the storage server 9, such as application attribute information, purchaser identification information, and purchase condition information, is also sent to the storage server 9. Unless the application is sent directly to the cellular phone 10, access to the sales server 12 and a purchase action may also be made from a ordinary personal computer and so on.

Figure 4:
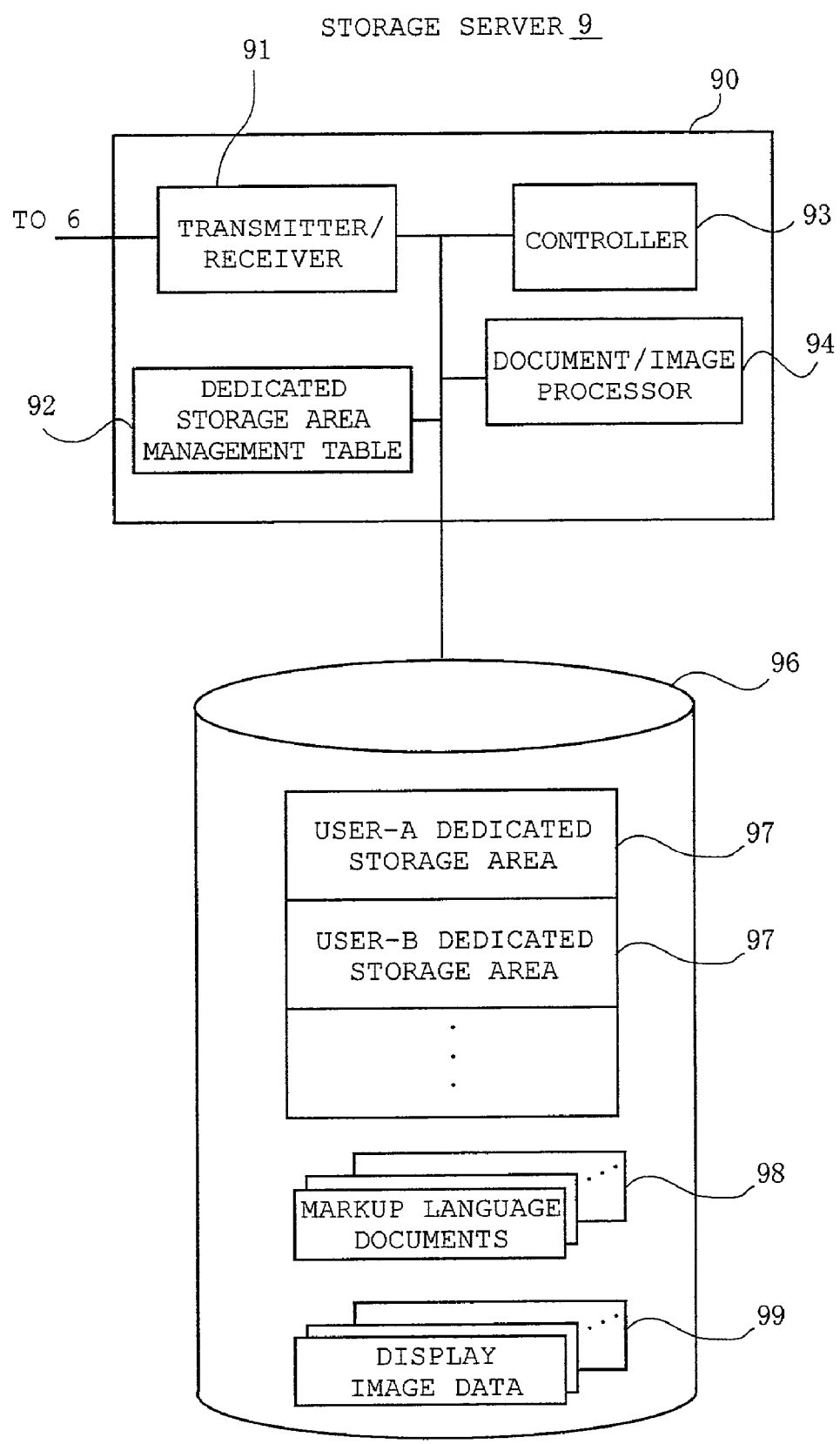
FIG. 4 is a block diagram showing an example of the configuration of a storage server 9 shown in FIG. 1.

Note that, for a purchased application, its application body need not be transferred directly from the sales server 12. In this case, an application body pre-stored in the storage server 9 may be used or an application may be obtained from a server (not shown) other than the sales server 12. Upon receiving application attribute information, user identification information, and so on, the storage server 9 stores the application body in the user-dedicated storage area 97 and, at the same time, creates a record for the application in a user-dedicated storage area management table 92 (FIG. 4).

Further, as will be described below, the application body need not be stored in the actual user-dedicated storage area 97 but need only be viewed from the user as if it was in the user-dedicated storage area 97.

When an application purchase request is received, the user is charged in a predetermined method. As the charging method, any conventional charging method may be used. For example, the charge is collected by a telephone company, is paid by a credit card, is paid by a prepaid card, and so on. Also, instead of charging the user for each application, it is possible to charge the user for a particular group of applications. The user is requested to pay the charge, for example, when a purchase request is sent to the sales server 12, when an application is downloaded from the storage server 9, or when a request for continued use is made after the trial period has elapsed.

The storage capacity of a storage area dedicated to each user is assumed to be sufficiently larger than that of internal storage of the cellular phone 10. The maximum capacity may also be set variable according to such factors as the basic service charge.

The types of applications used in the method according to the present invention are not limited. However, considering that an application will be executed on a portable data terminal with a limited storage capacity, there are some practical limitations and some examples are given below. Note that these are illustrative only but that the present invention is not restricted to those examples.

(1) Various Games

The games include not only offline games but also online games that allow the user to enjoy fighting games online with other terminals.

(2) Incoming-call Alerting Melody Composition Application

This program enables the user to compose a melody informing the user that a cellular phone has received an incoming call. In this case, the sound source LSI, though not shown in FIG. 2 (which will be described later), should preferably be provided.

(3) Household Account Book Application

When the user enters household account data offline and sends the entered data to the storage server 9 online, this program causes the storage server 9 to integrally manage the data and to calculate the total of each item. In this case, the processing program is prepared in the storage server 9.

(4) New Year's Card Transmission Application

When the user enters the addresses and messages of New Year's cards offline and sends the entered data to the storage server 9 online, this program causes the storage server 9 to print and send the New Year's cards. In this case, too, the processing program is prepared in the storage server 9.

The user makes an application purchase request through the sales server 12 and then accesses the storage server 9 from the cellular phone 10 to download the application body from the user-dedicated storage area 97 to the non-volatile storage device of his or her own. After this downloading, the user can execute the application locally. Each application remains available in the user-dedicated storage area 97 for a predetermined period. Therefore, only within that period, the user can re-download the application any time even if the user has erased the application from the cellular phone 10 because of internal storage constraints and so on. If the application has data associated therewith, the data is saved into the user-dedicated storage area 97 when the application is erased from the cellular phone 10 and then erased.

Figure 2:
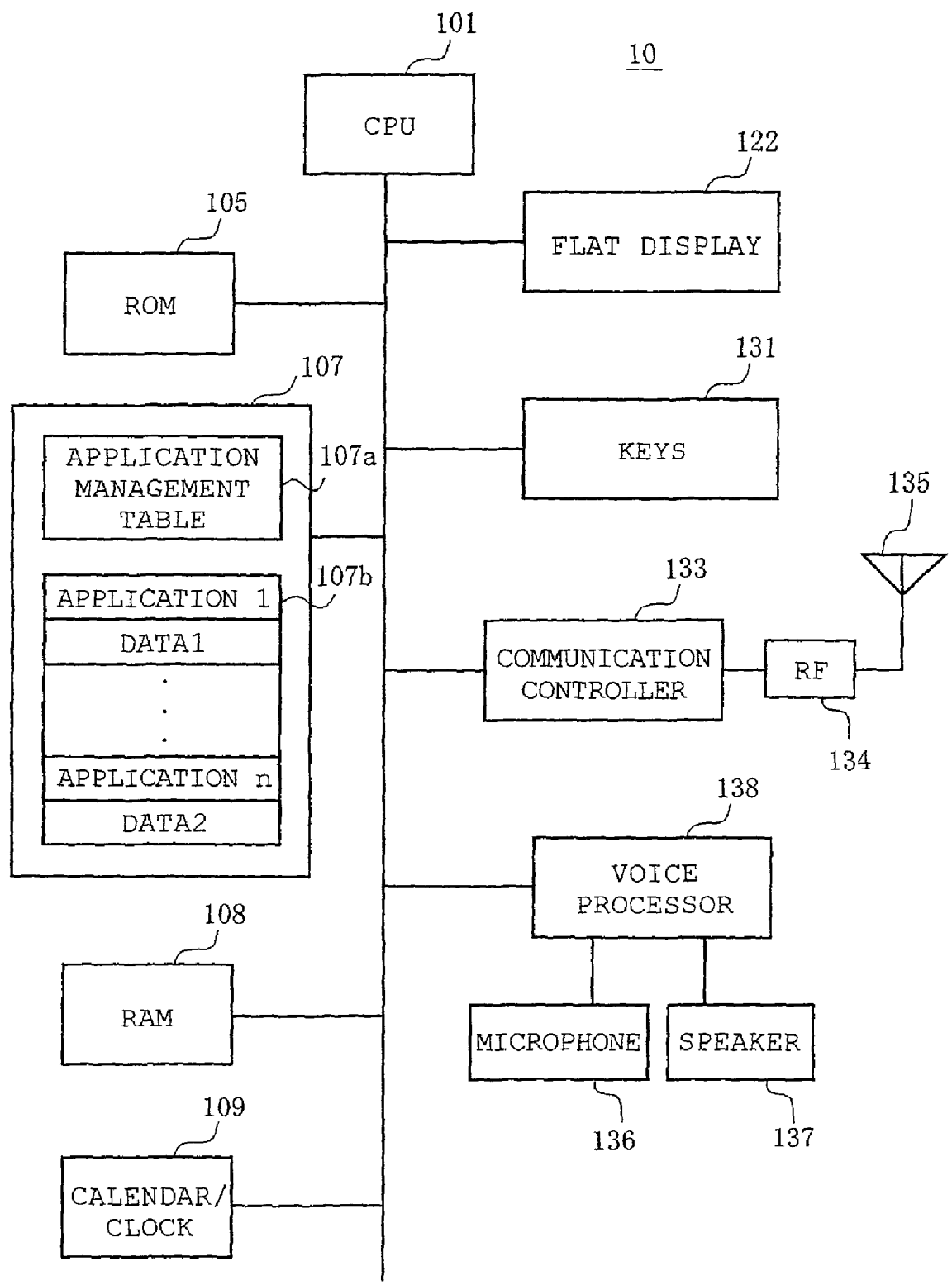
FIG. 2 is a block diagram showing an example of the outline hardware configuration of a cellular phone 10 shown in FIG. 1.

FIG. 2 shows an example of general hardware configuration of the cellular phone 10. In this configuration, a central processing unit (CPU) 101 controls the whole cellular phone 10. To the CPU 101, a ROM 105, a non-volatile storage device 107, a RAM 108, a calendar/clock 109, a flat display 122, various keys 131, a communication controller 133, and a voice processor 138 are connected. The ROM 105, a non-volatile read-only memory, contains various computer programs including a web browser to be executed by the CPU 101 as well as necessary data.

The non-volatile storage device 107, composed of re-writable memory, has an area 107b (local storage) for storing downloaded applications and data as well as an application management table 107a. In addition, the data includes data generated by applications and various communication addresses such as telephone numbers, FAX numbers, electronic mail addresses, and URLs. An example of such a non-volatile storage device is a flash ROM or the like.

The RAM 108 provides a temporary storage area and a work area required by the CPU 101 to execute programs and an area in which various types of data required for program execution are stored. The calendar/clock 109, which is battery operated, constantly provides the current date and time data.

The flat display 122 is a display device that informs the user of various types of information on this cellular phone. The keys 131 are a ten-key pad and other hardware keys used by the user to enter various instructions into the phone.

The communication controller 133, which controls the wireless communication of voice and data, is connected to an antenna 135 via an RF unit 134 for wireless signal processing. The voice processor 138 is connected to a microphone 136 and a speaker 137 for processing voice input/output.

In FIG. 2, the detailed configuration (for example, display memory, display controller, and so on) is omitted.

Figure 3:
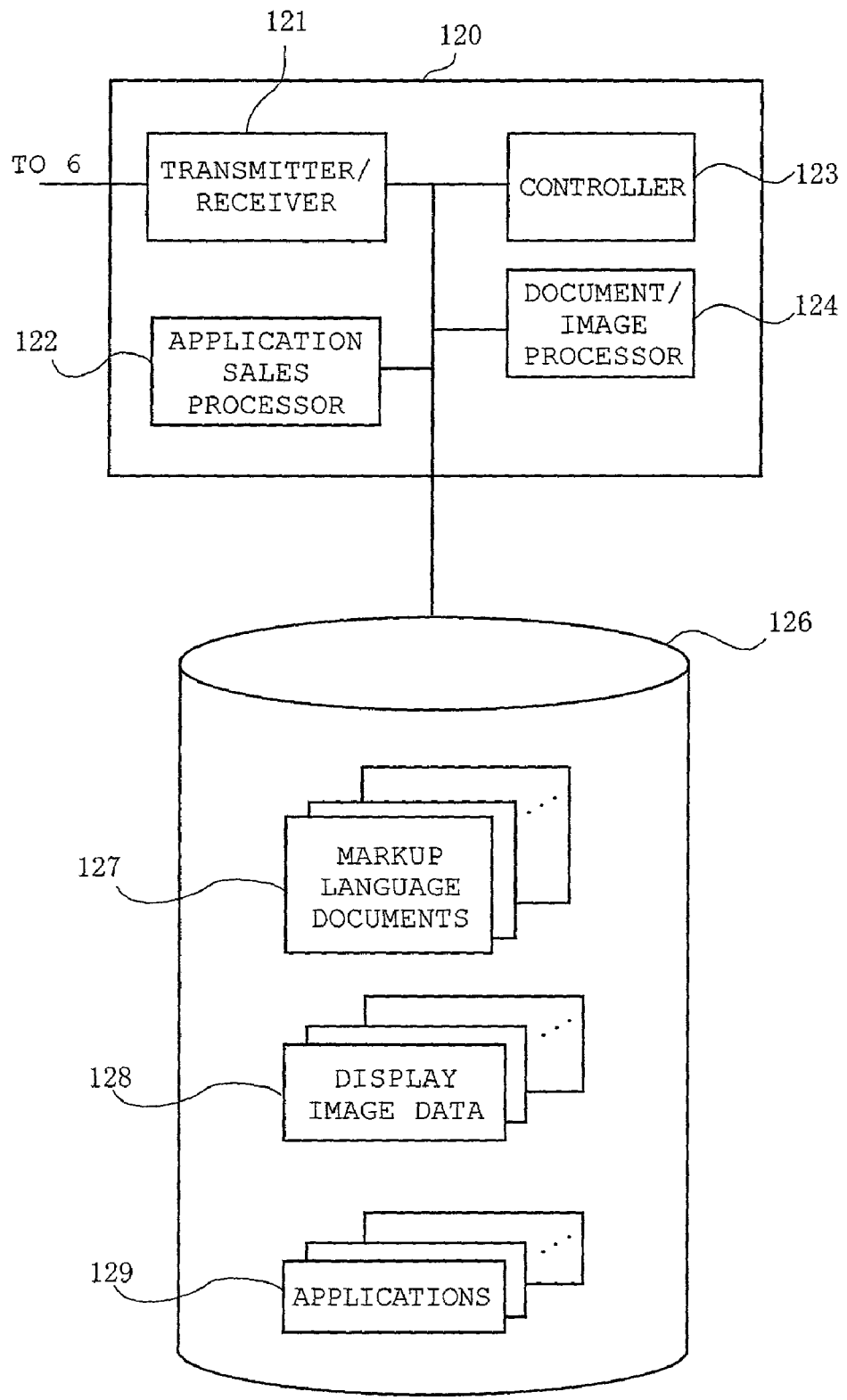
FIG. 3 is a block diagram showing an example of the configuration of a sales server 12 shown in FIG. 1.

FIG. 3 shows an example of the configuration of the sales server 12. This sales server 12 is divided into a high-performance data processor 120 and a large-capacity data storage unit 126.

The data storage unit 126 stores, in advance, markup language documents 127 that constitute home page data for application sales, display image data 128, and applications 129. The markup language, that is, a web description language, can include HTML, XHTML, XML, and so on. The image data 128 is built in, or linked to, the markup language document 127. The data processor 120, which is connected to the network 6 (FIG. 1), comprises a transmitter/receiver 121 that transmits and receives data (data in broader sense including applications), an application sales processor 122 that performs a user's payment processing upon receiving an application purchase request and transmission processing for transmission of data to the storage server 9, a document/image processor 124 that reads from, writes to, or processes the markup language documents 127 and display image data 128 stored in the data storage unit 126, and a controller 123 that controls all those functional units. As described above, the applications 129 to be sold need not necessarily be in the sales server 12.

FIG. 4 shows an example of the configuration of the storage server 9. The storage server 9 is divided roughly into a high-performance data processor 90 and a high-capacity data storage unit 96.

In the data storage unit (storage area) 96, the dedicated storage area 97 for the users is retained and, at the same time, markup language documents 98 and display image data 99 which constitute user interface screens are stored. In this example, each dedicated storage area stores applications and data for the user.

The data processor 90, which is connected to the network 6, comprises a transmitter/receiver 91 that transmits and receives data, the dedicated storage area management table 92 that manages the dedicated storage area for the users, a document/image processor 94 that reads from, writes to, and processes the markup language documents 98 and the display image data 99 stored in the data storage unit 96, and a controller 93 that manages the storage area 96 and controls those functional units.

Figure 5:
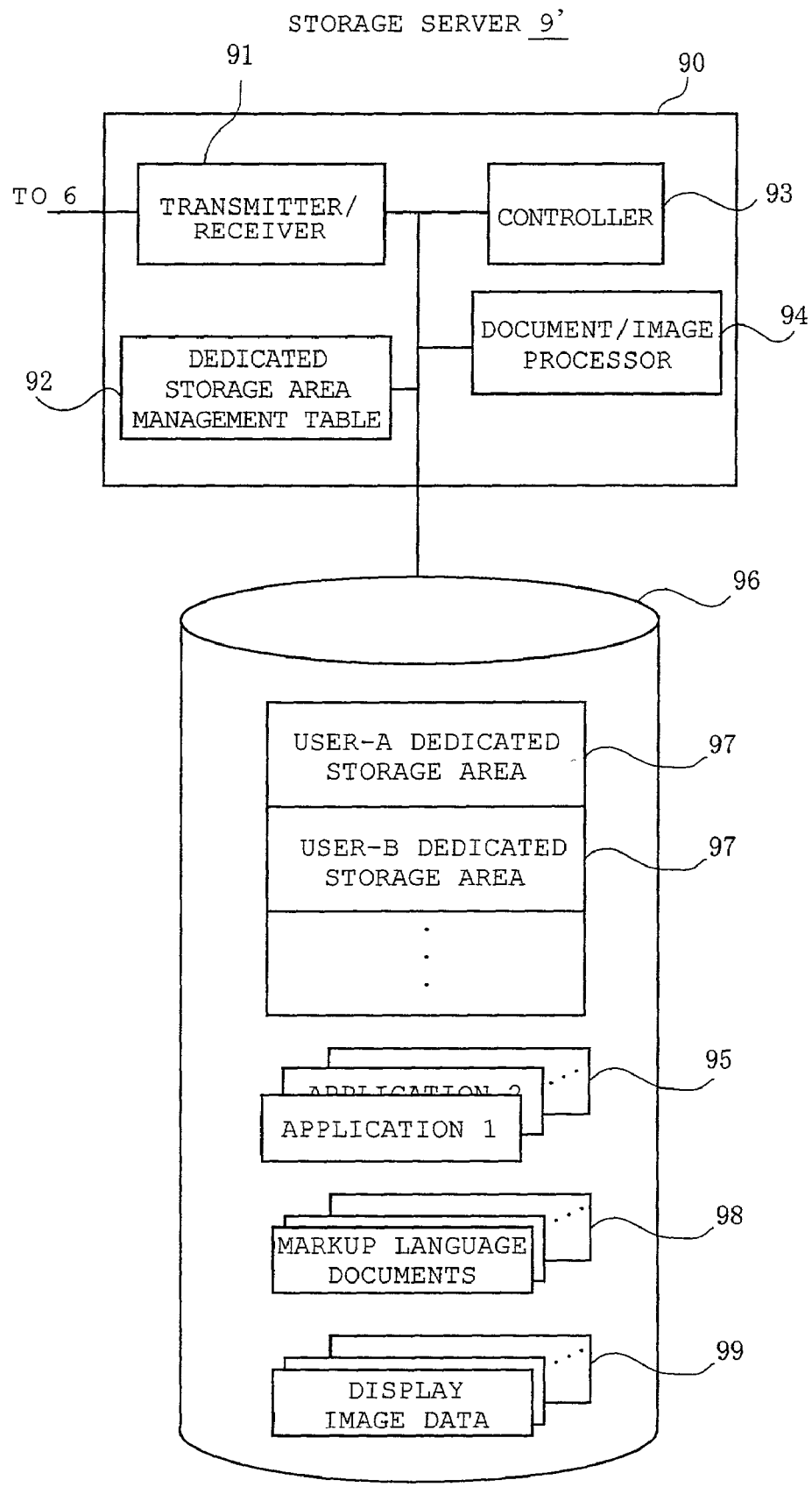
FIG. 5 is a block diagram showing a storage server 9' which is an example of another configuration of the storage server 9.

FIG. 5 shows a storage server 9' which has another configuration of the storage server 9. In the configuration in FIG. 4, because an application body purchased by the user is stored in the dedicated storage area 97, it is possible that the same application body is stored multiply in a plurality of dedicated storage areas 97. In contrast, in the configuration shown in FIG. 5, an application body is stored in a common storage area 95. This configuration eliminates the need for the same application body to be stored multiply in the storage area 96 and makes it possible to save the storage capacity of the storage area 96. In addition, when a sales server receives a purchase request for an already-stored application, the application body need not be transferred for storage. The storage server 9 checks the dedicated storage area management table 92 (which will be described later in detail) to know which user has which application. The user is not aware of the difference between the configuration FIG. 5 and the configuration in FIG. 4 but feels as if an application body was in the storage area dedicated to him or her.

FIG. 6 shows an example of the configuration of the application management table 107a included in the cellular phone 10 shown in FIG. 2. The table 107a, which stores attribute information on the applications downloaded to the cellular phone 10, has records, one for each application. In this embodiment, this table 107a is created, at the latest, when the user applies for a membership of the service provided by the storage server 9. Each record of the table 107a comprises an application name, sales site URL, file name, associated-data file name, expiration date, save flag, and data update flag.

The application name is the name of an application product shown to the user in the sales server, and the file name is the name of a file used to identify the application in the system. The sales site URL indicates the site address on the network at which the application is distributed. The electronic mail address of the sales site may also be stored in conjunction with the sales site URL. This sales site URL, though not essential, is provided for use in accessing the home page of the sales site again. The associated-data file name is the file name of data generated by each application. The expiration date indicates the date until which the user may use the application. This expiration date is determined by the date that is defined based on effective period and the purchase date (or date on which the application is stored in the dedicated storage area) defined for each application. The effective period of an application is either fixed or selectable by the user. Not all applications have expiration dates assigned, but some applications may not have an expiration date. The save flag is a flag indicating whether or not the application body of the application is now stored in the cellular phone.

The first time an application is downloaded to a cellular phone, the application attribute information obtained from the storage server 9 is stored in the application management table 107a. Thereafter, even if the application body is temporarily erased from the cellular phone because of storage capacity constraints, the attribute information remains in the application management table 107a. When the expiration date has reached, the application body is erased from the cellular phone but, in this embodiment, the attribute information remains in the cellular phone. This ensures that the information is available for use when a purchase request is issued for the same application again. In this case, however, the number of records in the application management table 107a goes on increasing. Therefore, it is desirable that some measure be taken, for example, a record should be erased automatically when a purchase request for the application of that record is not issued again for a predetermined period of time after expiation (for example, several months).

The update flag indicates whether or not data generated by the application has been updated. In this example, "1" indicates that "data has been updated." If the update flag is "1" when an application is erased, the data is written back into the dedicated storage area 97 so that, the next time the same application is downloaded, the application is allowed to use the latest data. If applications must be erased because of storage capacity constraints and application priority information must be defined to decide which application to erase, such a priority item may be added. As an example of priority, the download dates are used to erase applications in chronological order. As another example, it is possible to request the user to specify an application priority when the application is downloaded. As will be described later, the user is requested in this embodiment to select an application to be erased.

FIG. 7 shows an example of the configuration of the user-dedicated storage area management table 92 stored in the storage server 9 shown in FIG. 5. The table 92 is created when the user applies for a membership and, as with the application management table 107a, contains records, one record for each application. Those items of a record—application name, sales site URL, file name, associated-data file name, and expiration date—are the same as those in the application management table 107a. The table 92 has additional items, that is, an effectiveness flag, number of months, and automatic update flag.

The effectiveness flag indicates whether or not the user has an effective usage right now and, in this example, "1" indicates that the user has the usage right. The effectiveness flag value of "0" indicates that the user once purchased the application but does not have the usage right now because the expiration date has reached. The number of months indicates the effective period of each application. When the number of months is fixed for all applications, this item is not necessary. The automatic update flag specifies whether or not the application-usage right is to be automatically updated when the effective period has elapsed and, in this example, "1" indicates "automatic update." This automatic update flag is useful when the user is able to select at application purchase time whether or not the application-usage right is to be updated automatically. When automatic update is selected, the user is requested to pay an additional charge.

Note that a dedicated storage area in the storage server may be used by the user freely and, therefore, may be used not only as an area to store applications purchased from a sales server and its data but also as an area to store any data. That is, a dedicated storage area may be used as if it was a part of user's own portable data terminal. Such data may be managed by the dedicated storage area management table 92, in which case, only the necessary table items are used and the effectiveness flag is always fixed to "1".

Now, the specific operations of the servers and the terminal in the embodiment in the system configuration described above will be described.

Figure 8:
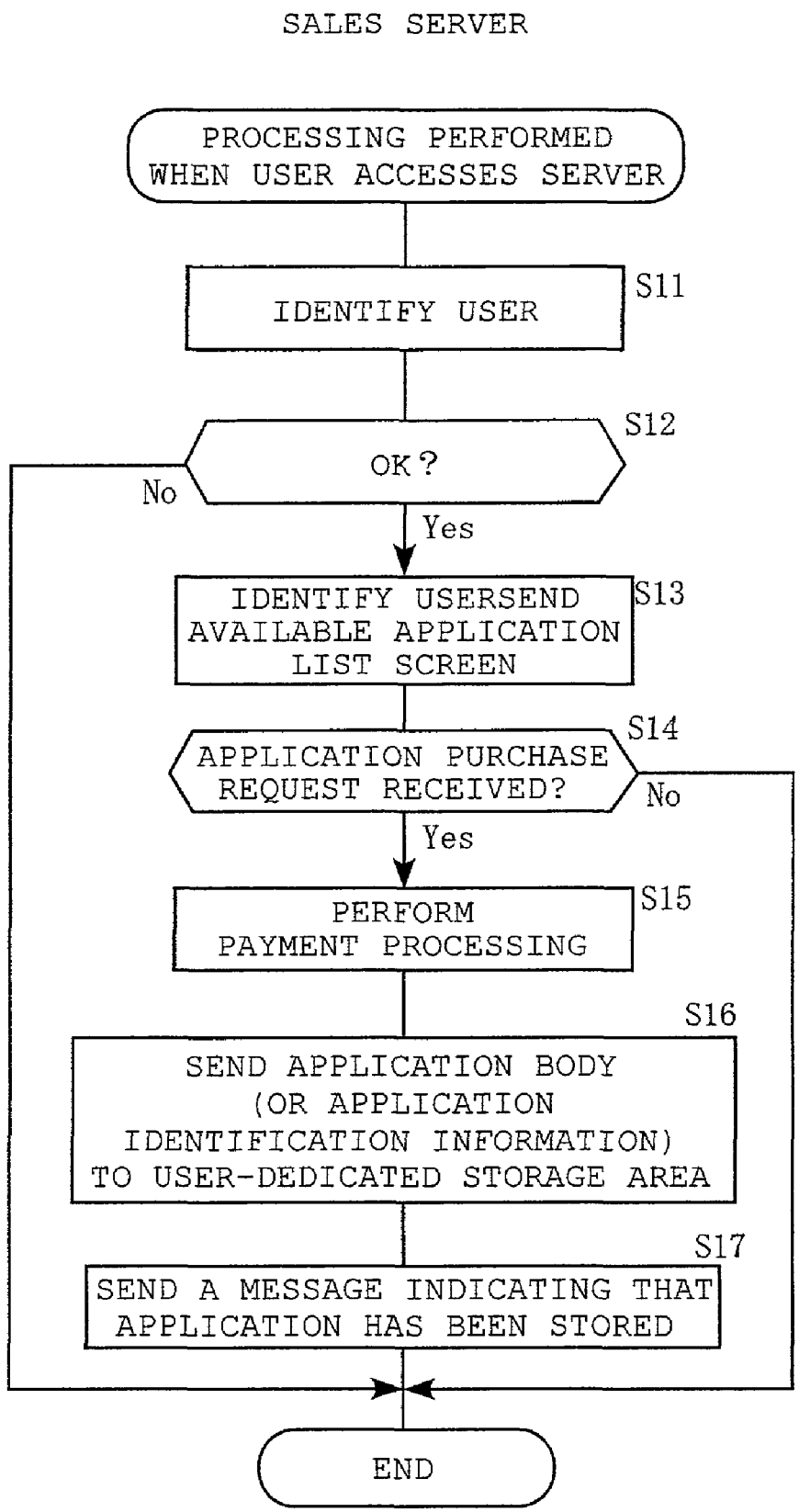
FIG. 8 is a flowchart showing processing performed in a sales server 12 when a user accesses it.
Figure 12:
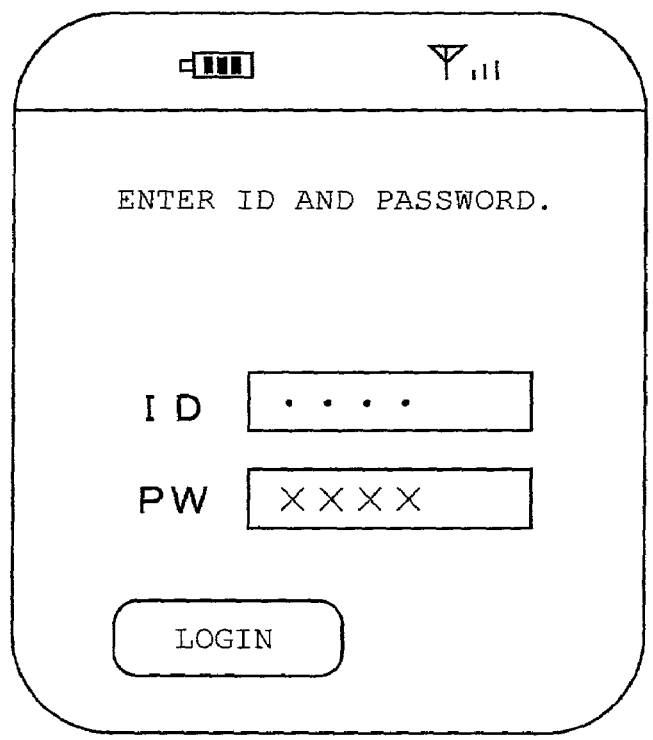
FIG. 12 is a diagram showing an example of screen used to identify whether the user is a member in a sales site or a storage server site in the embodiment of the present invention.
Figure 13:
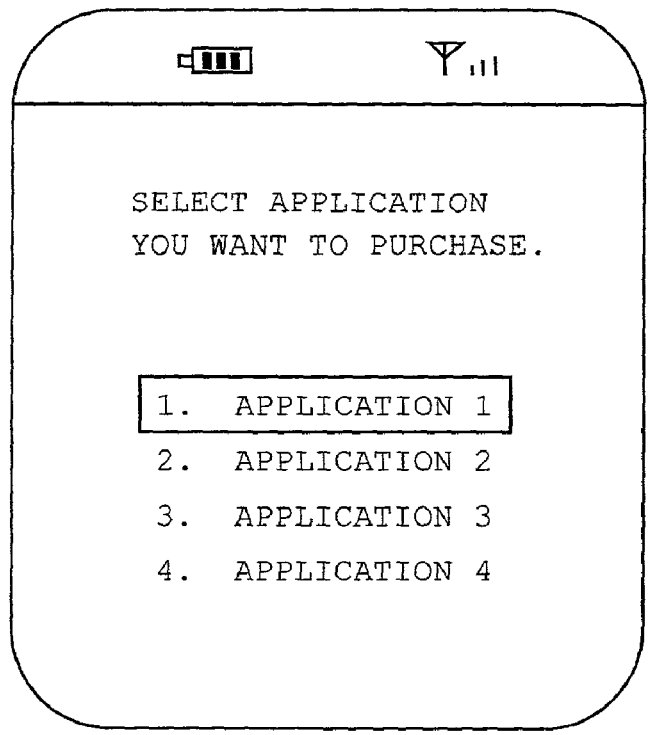
FIG. 13 is a diagram showing an example of screen on which a list of applications sold in a sales site is displayed in the embodiment of the present invention.
Figure 14:
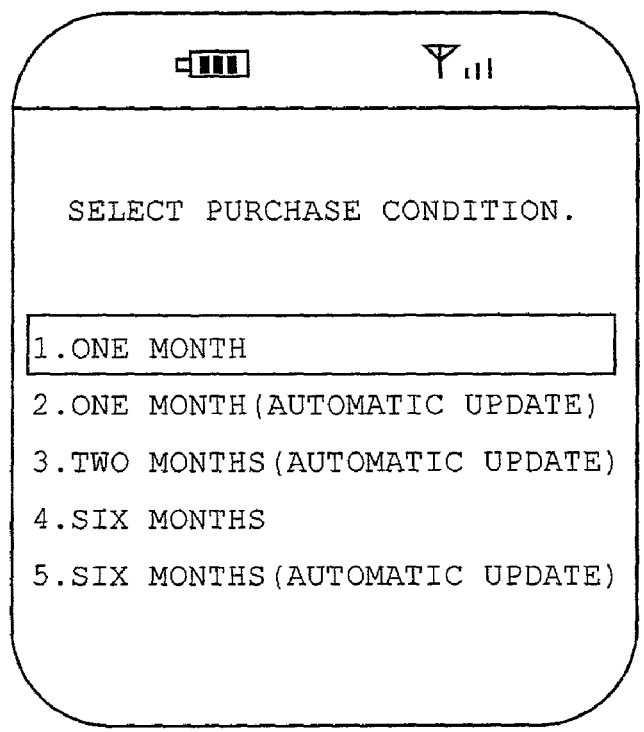
FIG. 14 is a diagram showing an example of screen used to select purchase conditions at a sales site in the embodiment of the present invention.

FIG. 8 is a flowchart showing processing performed when a user accesses the sales server 12. When the user of the cellular phone 10 accesses the sales server 12, the sales server 12 displays the home page screen, not shown, to identify whether or not the user is a member (S11). To do so, the server requests the user to enter the member ID and the password (PW) as shown in the example of screen in FIG. 12. In this case, as long as the application is not sent directly to the terminal of the user who accessed the server but is stored in the storage server, the server need not check that the access was made from a predetermined type of terminal. If the user is successfully identified (S12), information on the list of applications that may be purchased, i.e., a list screen, is sent to the user's cellular phone, and the list screen such as the one shown in FIG. 13 is displayed on the display (S13). Although the application names are displayed as "Application 1", "Application 2", and so on in this example, the product names are displayed in practice. In this case, the user may select purchase conditions, such as the effective period or the automatic update of the application-usage right, as shown in FIG. 14. Although not shown, the charging method may also be selectable as another purchase condition.

Figure 15:
FIG. 15 is a diagram showing an example of screen on which a message indicating that a purchased application has been stored in a user-dedicated storage area is displayed in the embodiment of the present invention.

Returning to FIG. 8, in response to an application purchase request when the user selects the name of an application to be purchased, for example, by moving the reverse display on the screen and presses the confirm key (S14), the sales server performs a user's payment processing using the charging method described above (S15) Note that actual payment processing may be performed on some other server (for example, relay server 4 or other special payment server). In addition, the member ID of the user, application body, and purchase condition information are sent to the storage server 9 to instruct it to store the application body in the user-dedicated storage area (S16). If the application body need not be sent from the sales server 12 to the storage server 9 as described above, the application identification information is sent instead of the application body. After that, a message such as the one shown in FIG. 15 is displayed to inform that the purchased application has been (or will be) stored in the user-dedicated storage area (S17).

Figure 9:
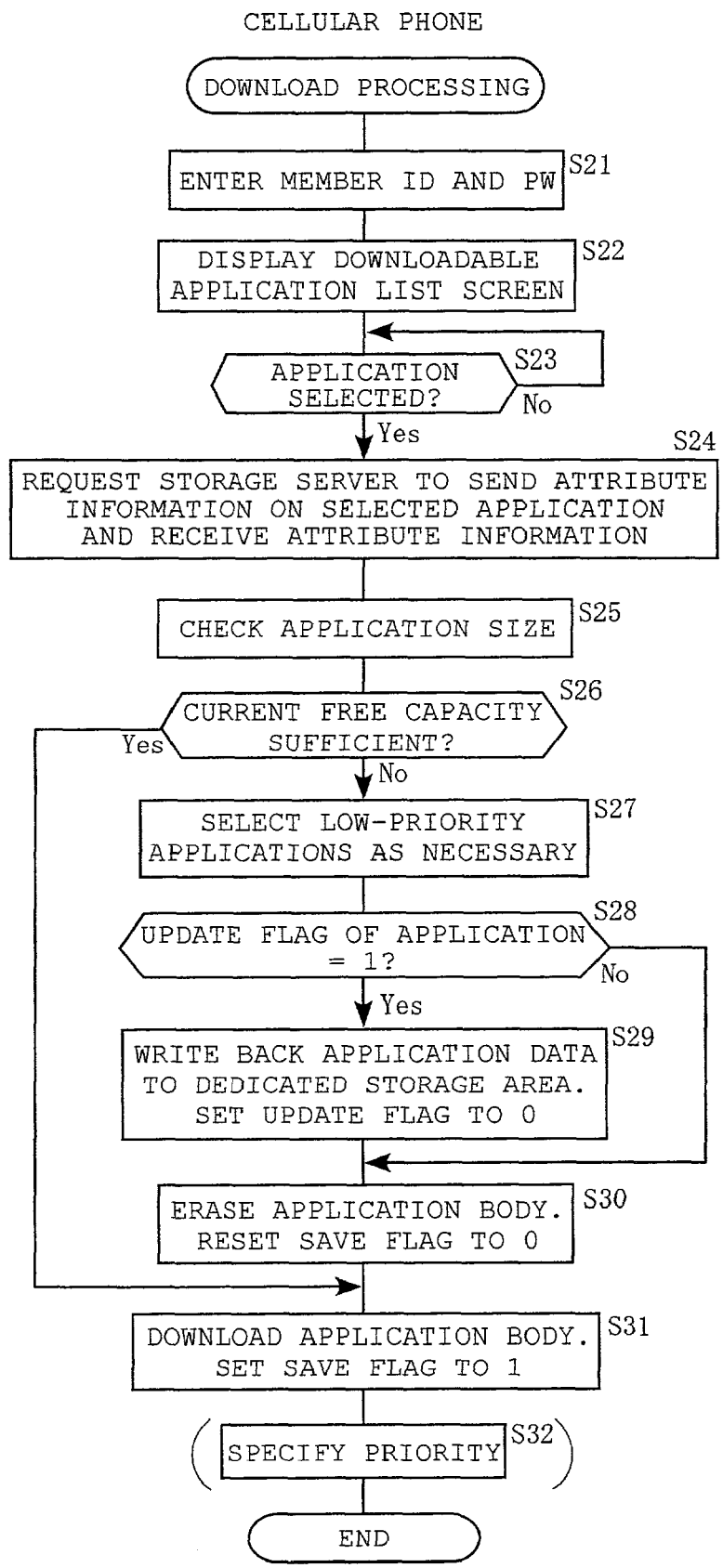
FIG. 9 is a flowchart showing an example of application download processing performed in the cellular phone 10.
Figure 16:
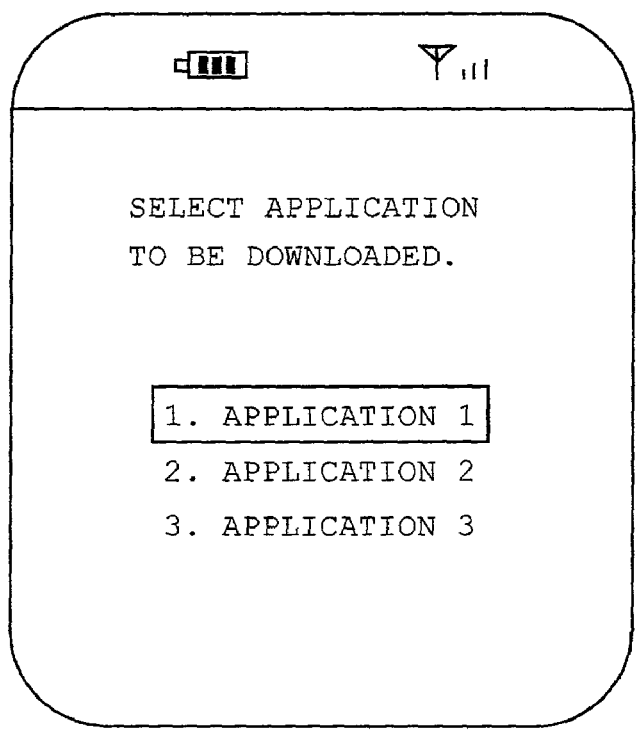
FIG. 16 is a diagram showing an example of screen used to locally select an application in the cellular phone in the embodiment of the present invention.
Figure 17:
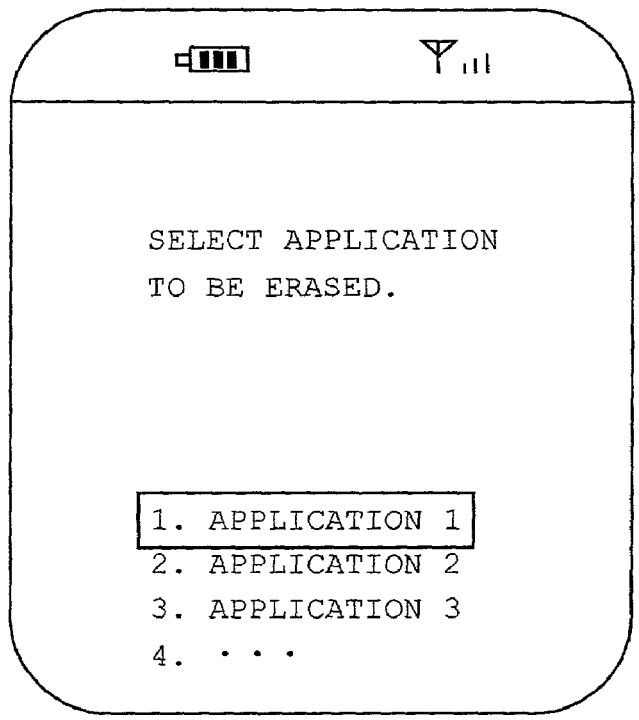
FIG. 17 is a diagram showing an example of screen that allows the user to select an application to be erased in the embodiment of the present invention.

FIG. 9 is a flowchart showing an example of application downloading processing performed in the cellular phone 10. First, when the cellular phone 10 accesses the storage server 9 via the relay server 4, the user is requested to enter the member ID and the password (PW) for user identification as described in step S11 in FIG. 8. In addition, the terminal type check described above is also made. If the results are successful, the downloadable application list screen, such as the one shown in FIG. 16, is sent from the storage server 9 to the cellular phone 10 and the screen is displayed on the display (S22). When the user selects from this list an application to be downloaded (S23), a request for the attribute information (file name, sales site URL, associated-data file name, file size, expiration date, and so on) is sent to the storage server and the requested information is received (S24). The attribute information on the same application, if already in the application management table 107a in the cellular phone, may also be used. From the attribute information, the size of the application is checked (S25). If associated data is present, the data size is also checked. Then, by comparing the capacity that will be required to store this application (and data) with the current free capacity, a check is made if there is a sufficiently large storage area (S26). If it is determined that the free capacity is insufficient, the body of a low-priority application is selected for erasure (S27). In this embodiment, the message as shown in FIG. 17 is displayed to request the user to select a low-priority application. If the free capacity is still insufficient after deleting one application, the user is requested to select another application. As described above, it is also possible to determine the priority not by the user but automatically. In such a case, applications are selected for erasure according to predetermined judgment criteria such as less-recently-downloaded applications or less-frequently used applications.

If the update flag of the application selected for erasure is "1" (S28), the data associated with the application (if any) is written back to the user's storage area and, at the same time, the update flag is reset to "0" (S29). Then, the application body is erased from the non-volatile storage device 107 and, at the same time, the save flag of the application in the application management table 107a is set to "0".

After that, the application body to be downloaded is downloaded (S31). When the application is downloaded for the first time, a new record is created in the application management table 107a. The save flag of the record is set to "1". The application priority, if specified by the user in another embodiment, is also specified (S32).

Figure 10:
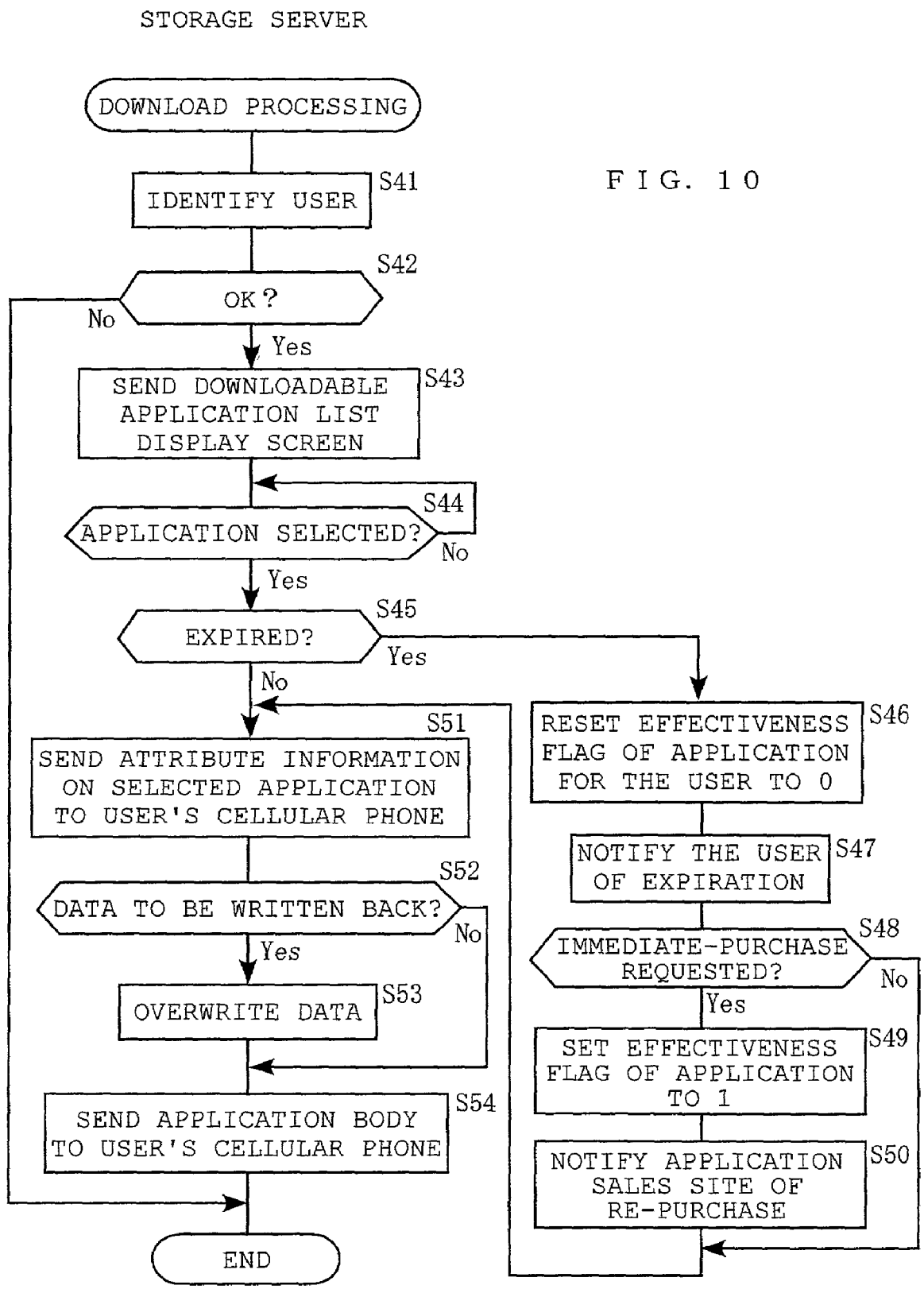
FIG. 10 is a flowchart showing an example of download processing performed in the storage server 9, which corresponds to download processing in the cellular phone 10, in an embodiment of the present invention.

Next, an example of download processing performed in the storage server 9, which corresponds to download processing performed by the cellular phone 10 described above, will be described with reference to the flowchart in FIG. 10. It is assumed at this point that, in response to the application purchase request that was made to the sales server 12, the application body has already been stored in the user-dedicated storage area 97 in the storage server 9 and that the record containing the application attribute information has already been added to the dedicated storage area management table 92 of the user.

First, the user identification processing and the terminal type checking are performed as described above (S41) and, if the result is successful (S42), the data on the downloadable application list display screen is sent to the cellular phone 10 from which the access was made (S43). When the user selects from this screen an application to be downloaded (S44), the server references the user-dedicated storage area management table 92 for this application and checks the effective period (S45). If the effective period has not expired, control is passed to step S51 that follows. If the effective period has expired, the effectiveness flag of the application of the user is set to "0" (ineffective) (S46). The application body may be erased from the dedicated storage area but, in that case, the application body will have to be stored again when it is updated or it is purchased again.

To check the expiration, predetermined update processing may be made periodically (for example, once at a predetermined time in a day) to check the expiration and to update the effectiveness flag. In that case, step S46 is not necessary.

Figure 18:
FIG. 18 is a diagram showing an example of screen on which an expiration notification is displayed in the present invention of the present invention.

Then, a message indicating that the application has expired is sent to the user (S47) For example, as shown in FIG. 18, a message is displayed to inform the user of the expiration and to prompt the user to purchase the application again. If "Now" is selected (S48), the effectiveness flag of the application is set to "1" (effective) (S49) and a repurchase request is sent to the sales site of the application (S50).

Alternatively, instead of the vendor, the controller 93 of the storage server 9 preferably references the dedicated storage area management table 92 to manage the applications regularly and, sometime (for example, one or more weeks) before the expiration, sends an electronic mail message to the user indicating that the application will expire soon so that the user is given an opportunity to purchase the application before it expires (update notice). However, this message is not necessary for an application for which automatic update option is set. Although the discontinuation of the automatic update service is not shown in the figure, the user must inform the storage server, either online or offline, of the discontinuation of automatic update service if necessary.

After that, in step S51, the attribute information on the selected application is sent to the cellular phone 10 in response to a request from the cellular phone 10. In addition, if it is found that some application must be erased from the cellular phone 10 and its associated data must be written back (S52), the associated data is overwritten on the corresponding data in the user-dedicated storage area 97 (S53).

Finally, the application body is sent to the cellular phone 10 (S54).

As described above, within the effective period, the user of the cellular phone 10 is allowed to download a necessary application from the storage server 9 anytime it is required.

Figure 11:
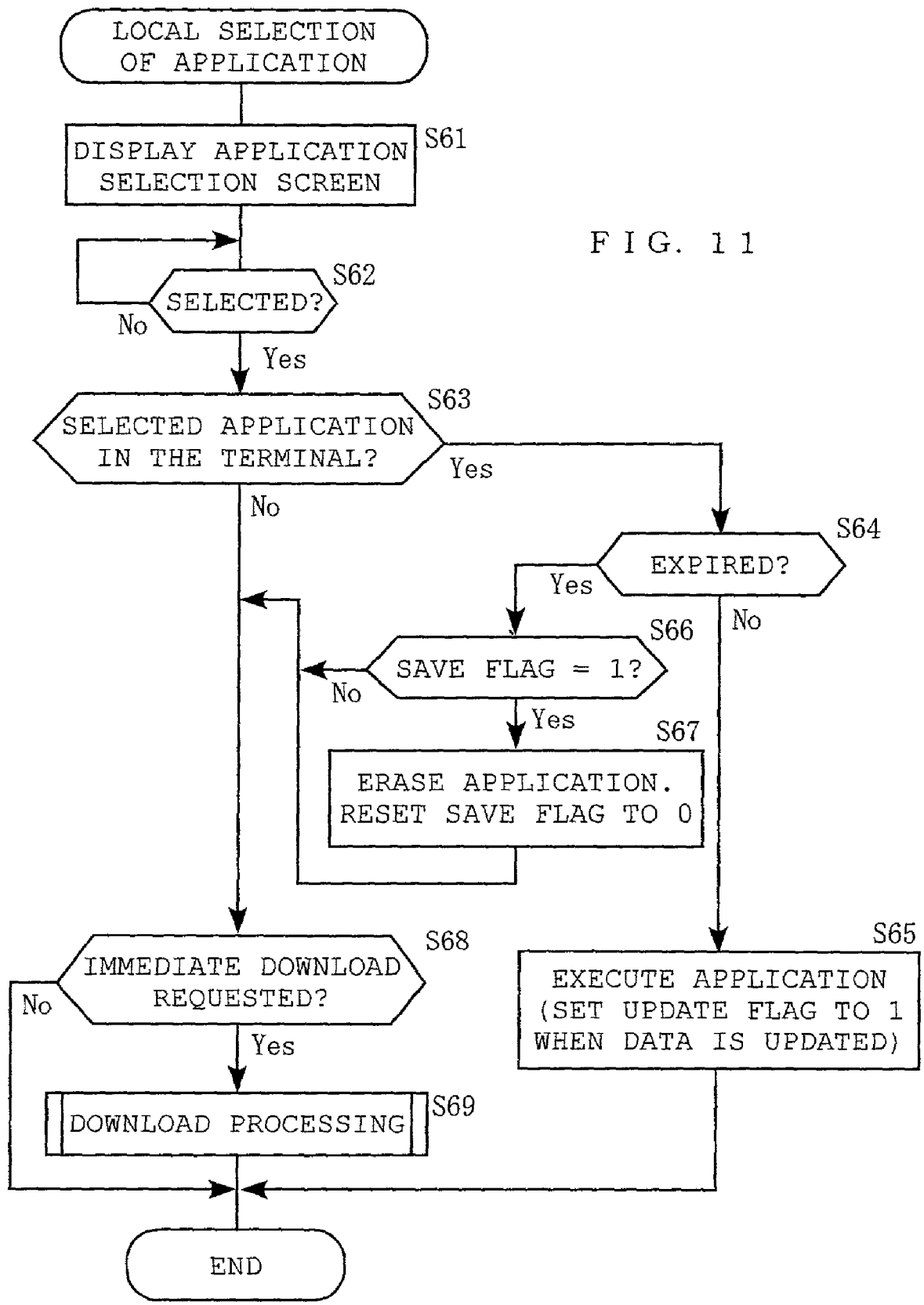
FIG. 11 is a flowchart showing an example of application local selection processing in the cellular phone 10 in the embodiment of the present invention.

Next, referring to the flowchart in FIG. 11, an example of local selection of an application by the cellular phone 10 will be described. The user of the cellular phone 10 is allowed to execute a downloaded application locally (offline). (Note that online processing may also be started when the application is executed).

Figure 19:
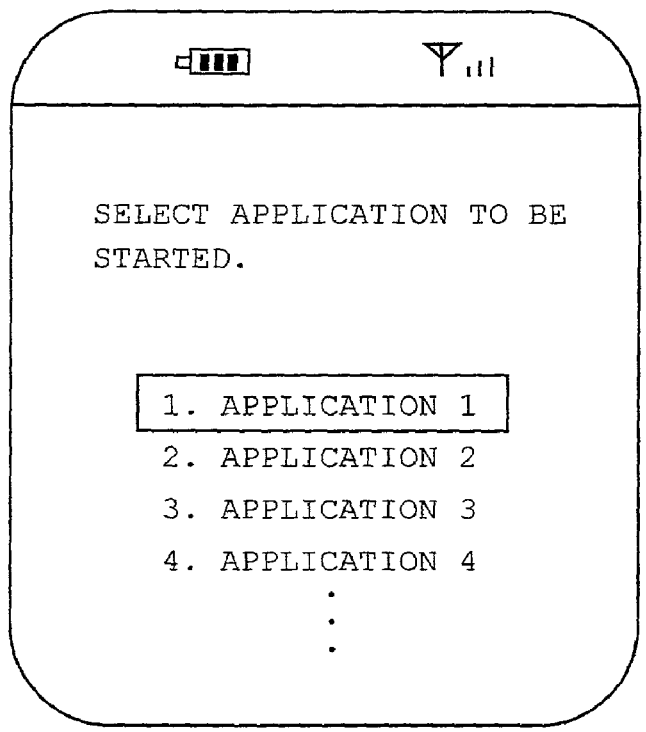
FIG. 19 is a diagram showing an example of screen that allows the user to select an application to be activated in the embodiment of the present invention.

First, the screen for selecting an application to be started, such as the one shown in FIG. 19, is displayed (S61). When the user selects an application (S62), the save flag in the application management table 107a is referenced to check to see if the application body is present in the cellular phone (S63). If the application is not present, control is passed to step S68 that follows. If the application is present, the expiration date of the application is checked (S64). If the application has not yet expired, the application is executed (S65). If the associated data is changed during execution of the application, the data update flag of the application is set to "1".

If it is found in step S64 that the application has expired and if the save flag is 1 (S66), the application body is erased and the flag is set to "0" (S67). Then, control is passed to step S68.

Although not shown in the figure, a message asking whether or not the application should be immediately downloaded from the storage server 9 is sent to the user in step S68. If a request to purchase the application immediately is received, the message to the effect is sent to the storage server 9 to cause it to perform download processing as described above (S69). However, because the application to be downloaded at this time is already determined, the application selection processing step is not necessary. Whether or not the application has expired is checked during the downloading process processing.

FIG. 20 shows an example of screen on which a message is displayed prompting the user to try the application instead of immediately purchasing it at the sales site. The user sometimes hesitates to purchase an application whose contents are unknown because the value of an application cannot be judged before it is actually executed. Thus, the user is allowed to try the application for a predetermined effective period (for example, one month). In this case, the same system configuration as that described above may be used, the trial period is set as the effective period of the trial application in the dedicated storage area management table 92 of the storage server 9, and the automatic update flag is set to "0" (no automatic update). The user is charged, neither when the application is stored in the dedicated storage area nor when the application is downloaded for trial, but when the user indicates his or her intention to continue to use the application after the trial period. This allows the user to try an application without concern. In this case, too, an update advice notification should preferably be sent to the user before the trial period expires.

Next, another embodiment of the present invention will be described. An application is purchased by the user who accesses a sales site in the first embodiment described above, while in another embodiment the vendor receives permission from the user to store an application in the dedicated storage area of each user. This method allows the user to identify that a new application is on sale and to immediately download it without having to access a sales site (or sites). In this embodiment, the user is charged when an application is downloaded. Alternatively, the example of the trial usage of application described above may also be used. In this case, the user is charged when the user indicates his or her intention to continue to use the application after the trial period.

The preferred embodiments of the present invention have been described, but the present invention may be modified or changed in various ways. For example, the present invention may be applied to the sales of not only applications but also data (for example, character images, music data, and so on). The processing indicated by the above flowcharts and the screens are illustrative only, but the present invention is not limited to the processing and screen examples. Data communicated among servers and terminals may be encrypted, for example, through the SSL (Secure Socket Layer or the like). A cellular phone may use the contents of the management table 107a to create and display its own application purchase history information. Similarly, the storage server may use the contents of the management table 92 to create the purchase history of each user.

The present invention enables a portable data terminal user to use a storage area on the network dedicated to the user as if it was a part of his or her own portable data terminal. In addition, the user may purchase software without concerning about the constraints of the storage capacity of the portable data terminal. This allows software vendors to increase the sales.

INDUSTRIAL APPLICABILITY

The present invention may be used for the design and manufacturing of portable data terminals and servers and for electronic commerce on a network using them.

The invention claimed is:

1. A method for providing storage areas in a storage server for a plurality of portable data terminals connected over a network, said method comprising the steps of:
    allocating a uniquely dedicated storage area for each of users of said plurality of portable data terminals;
    causing a software sales site on the network to receive an access directly from one of the portable data terminals so as to allow a user of said one of the portable data terminals to make a purchase-request of software;
    storing the software, which was purchase-requested at the software sales site by said one of the users from a portable data terminal of said one of the users, sent from the software sales site into one of dedicated storage areas uniquely allocated to said one of the users of the storage server without sending the software from the software sales site directly to the portable data terminal of said one of the users; and
    making available the software, stored in said one of the dedicated storage areas in said storage server, to said one of the users in response to a request from said one of the users, while keeping the software in said one of the dedicated storage areas.

2. The method for providing storage areas according to claim 1, wherein an expiration date until which said one of the users is allowed to use the software stored in said storage server is set, further comprising the step of making the software, which is in one of the dedicated storage areas, unavailable to said one of the users after the expiration date.

3. The method for providing storage areas according to claim 1, further comprising the step of charging one of the users for the purchase-requested software when the purchase-request is made, when said one of the users downloads the software from said one of the dedicated storage areas, or when said one of the users indicates an intention to continue to use after a trial period passes after the downloading.

4. The method for providing storage areas according to claim 1, further comprising the steps of:
    storing software, which is not purchase-requested by one of the users, into one of the dedicated storage areas uniquely allocated to said one of the users;
    allowing said one of the users to select the software not purchase-requested; and
    charging said one of the users for the software when said one of the users downloads the selected software or when said one of the users indicates an intention to continue to use after a trial period.

5. A storage server connected to a plurality of portable data terminals over a network, said storage server comprising:
    a storage unit having dedicated storage areas, each uniquely allocated to an individual user of one of said plurality of portable data terminals;
    means for receiving software, which is purchase-requested directly to a software sales site by one of the users from a portable data terminal of said one of the users, sent from the software sales site for storing the software into one of the dedicated storage areas uniquely allocated to said one of the users;
    a management table storing therein management information about the software stored in the dedicated storage areas of the users; and
    means for referencing said management table in response to access from one of the users and for sending the software, which is stored in one of the dedicated storage areas uniquely allocated to said one of the users, to the portable data terminal of said one of the users, while keeping the software in said one of the dedicated storage areas.

6. The storage server according to claim 5, wherein said storage unit further comprises a common storage area in which an application program body is stored as the software for common use by a plurality of users and wherein data associated with the application program and corresponding to each user is stored separately in the dedicated storage area of the user.

7. The method for providing storage areas according to claim 1, further comprising the steps of:
    accepting a purchase request of software from one of the users at the software sales site; and
    receiving, according to said purchase request, identification information of the purchase-requested software at a site of said storage server such that said identification information is stored into said one of the dedicated storage areas uniquely allocated to said one of the users.

8. The method for providing storage areas according to claim 1, wherein said step of storing software into one of the dedicated storage areas allocated uniquely to said one of the users, is performed after the software is purchase-requested at the software sales site on the network by the said one of the users.

* * * * *